(12) United States Patent
Reid

(10) Patent No.: US 8,677,660 B2
(45) Date of Patent: Mar. 25, 2014

(54) SUPPORT BRACKET FOR A TRACER WIRE CONDUIT AT A RISER PIPE OF AN UNDERGROUND PIPELINE

(76) Inventor: Michael A. Reid, Maryfield (CA)

( * ) Notice: Subject to any disclaimer, the term of this patent is extended or adjusted under 35 U.S.C. 154(b) by 0 days.

(21) Appl. No.: 13/611,749

(22) Filed: Sep. 12, 2012

(65) Prior Publication Data

US 2013/0199062 A1    Aug. 8, 2013

(30) Foreign Application Priority Data

Feb. 8, 2012   (CA) .................................. 2768040

(51) Int. Cl.
    *G09F 3/10*   (2006.01)
(52) U.S. Cl.
    USPC ........................ 40/299.01; 116/209
(58) Field of Classification Search
    USPC ........ 248/226.11, 227.2, 219.4, 219.3, 218.4;
                405/157; 116/209, DIG. 14; 138/104
    See application file for complete search history.

(56) References Cited

U.S. PATENT DOCUMENTS

| 7,318,293 | B2 * | 1/2008 | Ardern, II ....................... 40/666 |
| 7,451,721 | B1 * | 11/2008 | Garza et al. ................... 116/209 |
| 7,455,268 | B2 * | 11/2008 | Heath .......................... 248/74.1 |
| 7,712,283 | B2 * | 5/2010 | Gadd et al. ...................... 52/713 |
| 2009/0114776 | A1 | 5/2009 | Julian et al. |
| 2012/0138754 | A1 * | 6/2012 | Lim ............................. 248/74.1 |

FOREIGN PATENT DOCUMENTS

| CA | 2331319 | 8/2001 |
| CA | 2467127 | 11/2004 |

\* cited by examiner

*Primary Examiner* — Joanne Silbermann
(74) *Attorney, Agent, or Firm* — Kyle R. Satterthwaite; Ryan W. Dupuis; Ade & Company Inc.

(57) ABSTRACT

A support bracket for an upright tracer wire conduit proximate a pipeline riser with an above grade flange having bolt holes for receipt of mounting bolts. The bracket has a first hole sized to accommodate the mounting bolt shank diameter and a second hole spaced from the first hole and sized to accommodate a diameter of said upright tracer wire conduit. The bracket is thereby arranged for fastening to the above grade flange of the pipeline riser through alignment of the first hole of the bracket with one of the bolt holes of the above grade flange and fastening of the mounting bolt through said aligned holes in order to support the tracer wire conduit in an upright position extending through the second hole. A surface of the bracket facing away from the holes presents a label carrying area of the bracket for displaying identifying information concerning the pipeline or riser.

15 Claims, 2 Drawing Sheets

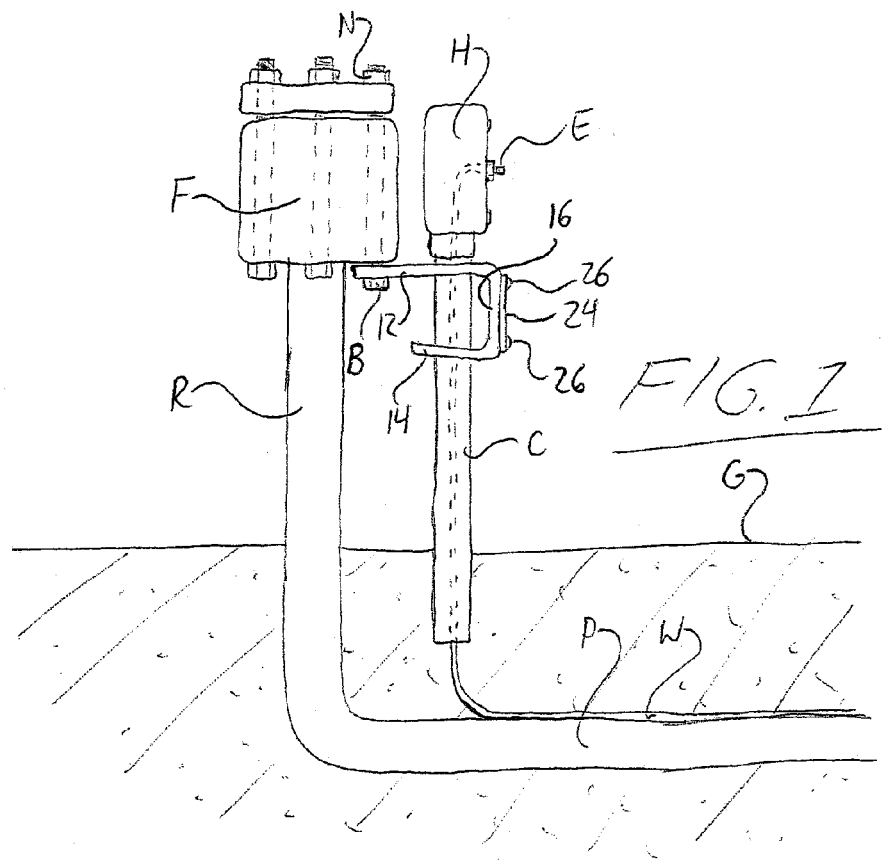
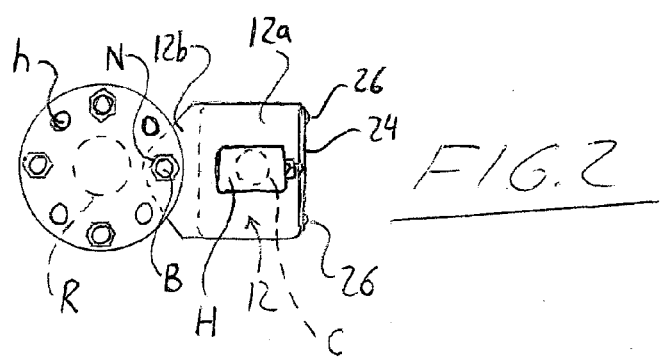

SUPPORT BRACKET FOR A TRACER WIRE CONDUIT AT A RISER PIPE OF AN UNDERGROUND PIPELINE

CROSS REFERENCE TO RELATED APPLICATIONS

This application claims benefit under 35 U.S.C. 119(A) of Canadian Patent Application Serial No. 2,768,040, filed Feb. 8, 2012.

FIELD OF THE INVENTION

The present invention relates generally to the use of tracer wires to locate underground pipes, and more particularly to a support bracket for mounting on an above-grade riser flange of an underground pipeline in order to support an upward projecting conduit containing a tracer wire for locating said underground pipeline.

BACKGROUND OF THE INVENTION

A known solution for locating non-metallic underground pipes is to bury a tracer wire with the pipe during installation of the pipeline so that an electrical signal can later be run through the wire along the pipeline so that a suitable detector can be used above ground to sense the signal and thereby detect the location of the pipe and determine the path of the pipeline. The free end of the tracer wire used to apply the electrical signal is typically routed up to ground level at or adjacent a riser pipe that also extends to the surface so that access to the tracer wire is easily found. It is known to store the free end of the tracer wire by taping, clamping or tying an exposed above-ground length of the wire to an above-grade structure, for example to the riser pipe itself.

More recently, in the oil and gas industry, it has been known to bury one end of a short length of PVC pipe to form a conduit projecting upright from the ground adjacent the riser of a non-metallic pipeline in order to protect the tracer from exposure to the elements. A weatherproof box or housing mounted atop the conduit has the free end of the tracer wire secured therein, for example by a set screw that clamps the free end of the tracer wire against an electrically conductive contact that forms or is connected to another conductive contact outside the housing, so that connection of a signal generator to the outside contact conducts the electrical signal into the tracer wire without having to directly couple to the tracer wire. This way, the above-ground length of tracer wire remains protected from loss, exposure to the elements, wildlife, etc. in its safe location inside the conduit and housing.

Applicant has made a further development in the form of a bracket that is operable to connect such a tracer wire conduit to the above-grade flange of a typical oil and gas riser pipe to maintain a stable and aesthetically pleasing position of the tracer wire conduit in general alignment with the upright riser pipe, and provide a suitable location for placement of readable information concerning the pipeline or riser.

SUMMARY OF THE INVENTION

According to a first aspect of the invention there is provided a support bracket for an upright tracer wire conduit projecting upward from ground proximate a pipeline riser with an above grade flange having bolt holes each dimensioned to accommodate a shank diameter of a mounting bolt, the bracket having a first through hole sized to accommodate said mounting bolt shank diameter and a second hole spaced from the first hole and sized to accommodate a diameter of said upright tracer wire conduit, whereby the bracket is arranged for fastening to the above grade flange of the pipeline riser through alignment of the first through hole of the bracket with one of the bolt holes of the above grade flange and fastening of the mounting bolt through said aligned holes in order to support the tracer wire conduit in an upright position extending through the second hole.

According to a second aspect of the invention, in a pipeline system having a pipeline riser with an above grade flange and an upright tracer wire conduit projecting upward from ground proximate said pipeline riser, there is provided a support bracket fastened to the above grade flange of the pipeline riser and bracing the tracer wire conduit in an upright position proximate the pipeline riser, the bracket preferably comprising a first hole through which the bracket is bolted to the above grade flange of the pipeline riser and a second hole through which the tracer wire conduit extends.

Preferably the first and second holes are defined in a first plate-shaped portion of the bracket.

Preferably the bracket comprises a second plate-shaped portion extending from the first plate-shaped portion of the bracket in a plane non-parallel thereto in order to define a display surface facing away from axes of the first and second holes.

Preferably the second plate-shaped portion is oriented at a right angle to the first plate-shaped portion.

Preferably the second plate-shaped portion is located on a side of the second hole opposite the first hole.

Preferably the bracket comprises a third plate-shaped portion extending from the second plate-shaped portion at a distance from the first plate-shaped portion to face toward the same, the third plate-shaped portion having a third hole therein that aligns with the second hole and is also sized to accommodate the diameter of said upright tracer wire conduit so that the first and third plate-shaped portions both support the tracer wire conduit.

Preferably the third plate-shaped portion does not intersect an axis of the first hole.

Preferably the third plate-shaped portion is greater in width than the first plate-shaped portion is at where the first hole passes therethrough, the width being measured in a direction transverse to a length direction along which the first and second holes are spaced apart.

Preferably the first plate-shaped portion is narrower in width on a side of the first hole opposite the second hole than on a side of the second hole opposite the first hole, the width being measured in a direction transverse to a length direction along which the first and second holes are spaced apart.

Preferably the bracket features a first surface through which the first and second holes pass and a second surface oriented non-parallel to the first surface to define a display surface facing away from axes of the first and second holes.

There may be provided indicia visibly displayed on the support bracket at display surface, said indicia defining an identification label for the pipeline riser.

Preferably the bracket comprises a channel shaped member having first and second leg portions joined by a central web portion therebetween, the first and second holes passing through the first leg portion and a third hole passing through the second leg portion in alignment with the second hole.

Preferably the second leg portion has a length shorter than the first leg portion in a direction in which the leg portions project from the central web portion.

Preferably the first hole is located at a position beyond the second leg portion in the direction in which the leg portions project from the central web portion.

BRIEF DESCRIPTION OF THE DRAWINGS

In the accompanying drawings, which illustrate exemplary embodiments of the present invention and are not necessarily to scale:

FIG. 1 is a schematic side elevational view of a riser pipe and tracer wire conduit of an underground pipeline featuring a support bracket mounted to an above grade flange of the riser pipe in order to support the upright tracer wire conduit and present a visible label concerning the pipeline or riser pipe.

FIG. 2 is a schematic overhead plan view of the riser pipe, tracer wire conduit and support bracket of FIG. 1.

DETAILED DESCRIPTION

Figure 3:
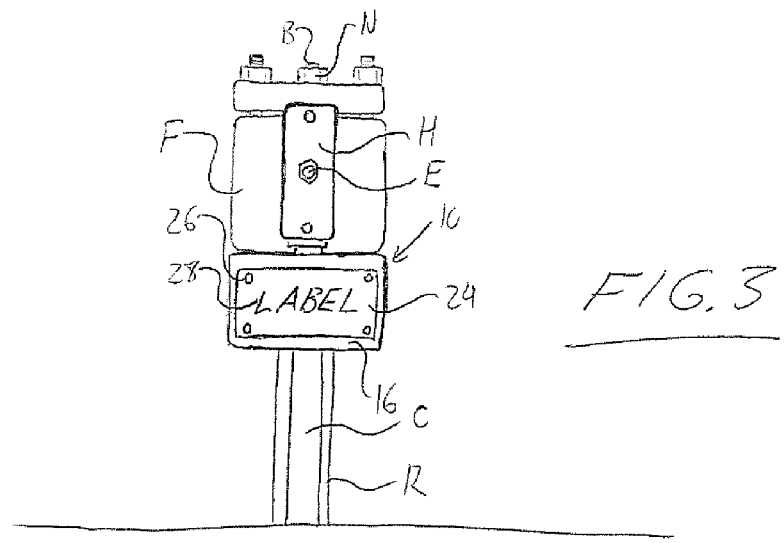
FIG. 3 is a schematic front elevational view of the riser pipe, tracer wire conduit and support bracket of FIG. 1.
Figure 5:
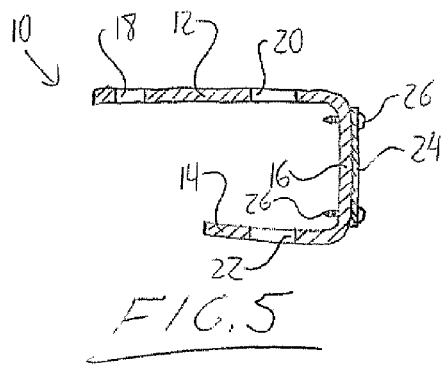
FIG. 5 is a cross-sectional view of the support bracket of FIG. 4 as taken along line V-V thereof.
Figure 4:
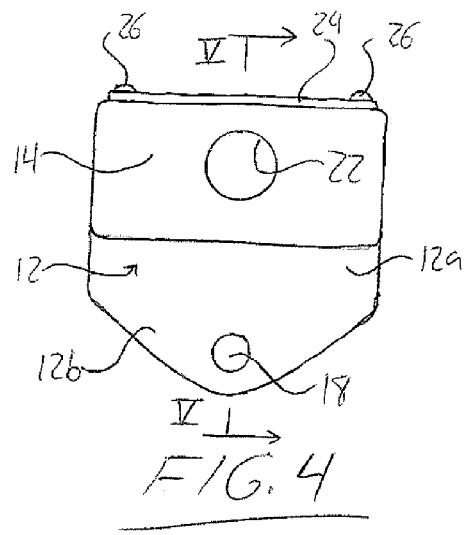
FIG. 4 is a bottom plan view of the support bracket of FIG. 1.

FIG. 1 shows a riser pipe R of a type commonly found at an oilfield lease. The riser pipe R connects to an underground pipeline P beneath the ground surface G and travels upward through the surface to a short elevation above ground, where the riser R features a circular flange F projecting radially outward from the remainder of the riser below the flange F. The flange features a series of bolt holes h spaced around its circumference between the outer perimeters of the flange F and the smaller-diameter unflanged portion of the riser below the flange F. The flange and bolt holes of the riser form a means by which equipment can be seated on the above-grade end of the riser, and mounted thereto by use of bolts B and respective nuts N fastened together through the bolt holes in the flange F and through matching bolt holes in the equipment, which may for example be a pig launcher for use in cleaning or inspecting the pipeline, or an emergency shut down valve for controlling flow through the pipeline. Composed of plastic pipes, the pipeline P thus features a tracer wire W running therealong and extending upward out of the ground through a PVC pipe or other suitable conduit C at a position near the riser R at a short radial distance outward from the riser and its flange F. At the top end of the conduit C, a weatherproof housing H contains the free end of the tracer wire W, and employs a conductive connector with an external contact E outside the housing H for coupling thereto by a suitable tracer wire signal source (not shown) and an internal contact against which the free end of the tracer wire W is held, for example by a set screw.

Where the present invention differs from conventional pipeline riser setup with a protective tracer wire conduit is in the addition of a support bracket 10 that is fastened to the flange F of the riser pipe R and embraces around the tracer wire conduit C to reliably support the conduit C in an upright, preferably vertical, orientation parallel, or at least substantially parallel, to the riser pipe R. The bracket 10 also provides additional functionality in adding a suitable surface to which a label or indicia may be applied in order to identify the pipeline P or riser R to service personnel visiting the site to ensure that they can conveniently and reliably confirm the correct riser (which may be one of multiple risers on the same lease or site) in order to properly and safely perform the desired or necessary testing, inspection, cleaning or other operations.

The illustrated bracket is a channel-shaped single-piece member having three flat or plate-shaped portions formed as seamlessly integral parts of a single unitary body of a UV- and corrosion-resistant plastic. However, other materials and constructions may be employed, for example a metal bracket, whether in the form of bent but unitary body or assembled together from multiple pieces by welding or fasteners. The channel shape of the member features two leg portions 12, 14 projecting in a common direction from opposite ends of a central web portion 16 spanning between the two legs, with the second leg 14 being shorter than the first in this projecting direction, thereby giving the piece a J-shaped cross-section. The bracket features three holes, more specifically a first hole 18 passing through the first leg portion 12 near a free end thereof opposite the central web portion 16, a second hole passing through the first leg portion 12 nearer the central web portion 16 at a distance from the first hole 18, and a third hole 22 passing through the second leg portion 14 in alignment with the second hole 20 in the first leg portion 12.

The first hole 18 is sized to match or closely correspond to the size of the bolt holes in the riser pipe flange 14, so that with the first leg 12 placed beneath the flange F with the first hole 18 in alignment with one of the flange's bolt holes, the free end of the shank of a respective bolt B can be passed through the aligned holes and threaded into a respective nut N at the other end of the aligned holes in order to fasten the bracket 10 to the flange F. The second and third holes 20, 22 are sized to slightly exceed the outer diameter of the tracer wire conduit C, so that during assembly and installation of the conduit C and housing H, the bracket 10 can be slid onto the conduit before the tracing wire is secured to the connector and the housing is fastened or fixed in place at the top end of the conduit. As the illustrated housing H is notably larger than the conduit and thus will not fit through the second and third holes of the bracket, the bracket 10 may either be slid onto the conduit over the bottom end thereof before the tracing wire W is fed through the conduit, or thereafter be slid onto the conduit over the top end thereof before the tracing wire W is coupled to the connector inside the housing H.

FIG. 1 shows the bracket 10 installed on a vertically-oriented riser pipe R by fastening of a bolt B through the first hole 18 of the bracket and a respective bolt hole in the flange F of the pipe so that the first leg 12 of the bracket 10 juts horizontally and radially outward from the pipe flange F from immediately therebeneath, and the tracer wire conduit C passes vertically through the second hole 20 of the bracket. The central web portion 16 of the bracket 10 is angled relative to the first leg to extend downward therefrom, preferably at a right angle as shown in the illustrated embodiment, whereby the central web portion 16 lies in a vertical plane parallel to the axis of the riser pipe R. The second leg portion 14 juts back toward the riser pipe R from the bottom end of the central web portion 16, but is shorter in length than the first leg portion 12, reaching only as far as an intermediate location between the two holes of the first leg. Accordingly, the second leg 14 does not reach a position beneath the pipe flange F, instead stopping short of the pipe flange F and the first bracket hole 18 so as to leave open space therebeneath for accessing the bolt head or nut of the fastener used to mount the bracket in place. Each embracing around the trace wire conduit C, the first and second leg portions 12, 16 thus support the tracer wire conduit C in order to retaining the same in a vertical orientation parallel to the riser pipe R in a stable reliable manner.

The side of web facing away from the leg portions presents a vertically oriented face or surface suitable for use in displaying a label that may used to present information on the riser or pipeline. In the illustrated embodiment, a label plate 24 is fastened to the web portion 16 of the bracket 10 to rest against the outer face thereof, for example using screw fasteners 26 driven through the label plate 24 into the web portion of the bracket. As shown in FIG. 3, the label plate has indicia 28 applied thereto in order to form the readable label. The position of the label plate 24 on the web portion 16 of the bracket means that it faces radially outward away from the axes of the riser pipe, bracket-fastening mounting bolt B and tracer wre conduit C so as to be visibly apparent while approaching the riser from the side thereof on which the tracer wire conduit is installed.

In the illustrated embodiment, the label plate is a flat rectangular piece of polystyrene or other plastic material that is white or otherwise lightly coloured so as to present a bright surface that will contrast nicely with dark text that may be manually written thereon with a marker. Other embodiments may employ alternate label types, for example a machine-printed or hand-written label on a substrate of paper or other stock that is adhesively or mechanically fastened to the bracket, and preferably coated or covered for protection from the elements. For example, a printed paper label may be both adhered to the bracket and protectively covered through use of transparent or translucent tape. Accordingly, the web 16, in its direction spanning between the two legs 12, 14, is sufficiently dimensioned, for example 3-inches or greater, to accommodate the width of common commercially-available packing tape. This way, the tape can be wrapped horizontally around the web and label in order to adhere the label to the web and protect the label, while leaving the indicia on the label visible through the transparent tape.

As further alternatives to manually or machine inked labels, painted, embossed, etched or other labels may be employed. In other embodiments, the indicia may be farmed directly on the bracket itself instead of on a separately produced label that is subsequently attached to the bracket. However, use of a blank label or bracket allows the end user or installer to easily mark the bracket in any desired manner, and may reduce fabrication time and costs compared to customer-requested custom labels printed by the bracket manufacturer, distributer or supplier.

Figure 6:
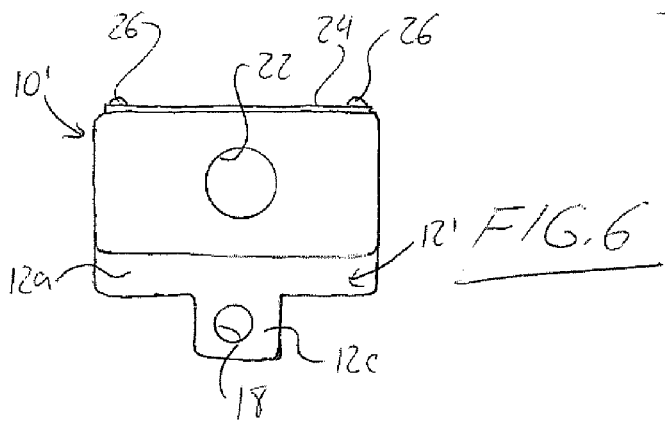
FIG. 6 is a bottom plan view of an alternate embodiment support bracket.

As shown in FIG. 2, the first leg 12 of the bracket 10 has a rectangular portion 12a that is of equal width to the rectangular web 16 and extends therefrom, and a tapered portion 12b which then extends from the rectangular portion and narrows in width toward the free end of the first leg 12 furthest from the web 16. This tapered configuration of the first leg 12 to be narrower at the free end thereof than at its opposing web-connected end balances the desire to have a suitably wide web 16 for presentation of a sufficiently large label for convenient readability with the desire to have the leg 12 narrow enough at its first opening and free end so as not to interfere with the bolt holes of the riser pipe flange F on either side of the bolt hole through which the bracket is fastened. FIG. 6 shows an alternate embodiment bracket 10' differing only in that the first leg 12' lacks a gradually narrowing tapered portion, and instead has a narrower second rectangular portion 12c jutting from the first rectangular portion 12a at the end thereof opposite the web 16. The first leg 12' is thus again narrower at its free end and first hole 18 than at its connection to the web 16, but employs a single squared off step-like reduction in width rather than a gradual taper.

The illustrated embodiment has the web positioned to reside entirely radially outward from the tracer wire conduit, but other embodiments may instead have the top and bottom walls or legs joined together by a side wall on one or both lateral sides of the conduit, each presenting an surface facing outwardly away from the top and bottom walls or legs for application of a suitable label or markings. In another embodiment, the bracket may comprise a solid block of material having vertical through holes for the mounting bolt and tracer wire conduit rather than a channel-shaped member. One or more outer surfaces of the block could be used for display of label markings. However, the channel-like bracket of the illustrated embodiment is more material efficient, and thus may be lighter in weight, and the use of a thin plate-like shape at the location of the first through-hole allows the use of an existing pipe flange mounting bolt without having to substitute a longer bolt capable of passing through a thicker bracket portion.

Another alternate embodiment may feature an L-shaped bracket consisting of only two legs disposed at an angle to one another, for example forming the same structure as that defined by the first leg 12 and web 16 of the illustrated channel-shaped embodiment. The L-shaped embodiment would thus have the first and second holes extending downward through a horizontal one of the legs to accommodate the mounting bolt B and tracer wire conduit C, and would employ the second vertically depending leg for the label/marking display functionality of the web of the illustrated embodiment. However, the channel-shaped illustrated embodiment may provide better support of the conduit by having it embraced by two legs at spaced apart positions along the conduit, providing more stability than an L-shaped bracket bracing the conduit at only one height therealong and over a smaller circumferential surface area thereof. Another embodiment may be in the form of a single flat plate like the first leg of the illustrated channel-shaped bracket, the single plate having holes for the mounting bolt and tracer wire conduit, but lacking a label display surface like that provided by the web of the illustrated channel-shaped embodiment.

As illustrated, the first and second legs of the bracket need not be perfectly parallel to provide the general configuration of two legs embracing about the tracer wire conduit C above and below a web that interconnect the two legs, and it will likewise be appreciated that the web need not be entirely perpendicular to the first leg in order to present an outward facing surface for carrying a label or markings to identify the riser or pipeline to service personnel. Similarly, the conduit-receiving holes need not have their axes perfectly coincident in order to align sufficiently enough to allow passage of a conduit of predetermined size through them in a manner fitting closely enough therearound to prevent significant displacement or tilting of the conduit. While the illustrated embodiment features fully surrounded through holes in order to maximize the bracket strength, it will be appreciated that the bracket need not necessarily span a full 180-degrees around the conduit in order to support the same.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. In a pipeline system having a riser pipe and an upright tracer wire conduit projecting upward from ground proximate said riser pipe, a support bracket fastened to an above grade flange on the riser pipe that projects radially outward relative to a smaller-diameter unflanged portion of the riser pipe located below said above grade flange, the bracket comprising a first hole through which the bracket is bolted to the above grade flange on the riser pipe and a second hole around which the bracket and the tracer wire conduit are fitted together to support the tracer wire conduit in an upright position proximate the riser pipe.

2. The support bracket of claim 1 wherein the first hole is defined in a first plate-shaped portion of the bracket.

3. The support bracket of claim 2 comprising a second plate-shaped portion extending from the first plate-shaped portion of the bracket in a plane non-parallel thereto in order to define a display surface facing away from axes of the first and second holes.

4. The support bracket of claim 3 wherein the second plate-shaped portion is oriented at a right angle to the first plate-shaped portion.

5. The support bracket of claim 3 wherein the second plate-shaped portion is located on a side of the second hole opposite the first hole.

6. The support bracket of claim 3 comprising a third plate-shaped portion extending from the second plate-shaped portion at a distance from the first plate-shaped portion to face toward the same.

7. The support bracket of claim 6 wherein the third plate-shaped portion does not intersect an axis of the first hole.

8. The support bracket of claim 6 wherein the third plate-shaped portion is greater in width than the first plate-shaped portion is at where the first hole passes therethrough, the width being measured in a direction transverse to a length direction along which the first and second holes are spaced apart.

9. The support bracket of claim 3 comprising indicia visibly displayed on the support bracket at the display surface, said indica defining an identification label for the pipeline riser.

10. The support bracket of claim 2 wherein the first plate-shaped portion is narrower in width on a side of the first hole opposite the second hole than on a side of the second hole opposite the first hole, the width being measured in a direction transverse to a length direction along which the first and second holes are spaced apart.

11. The support bracket of claim 1 comprising a first surface through which the first hole passes and a second surface oriented non-parallel to the first surface to define a display surface facing away from axes of the first and second holes.

12. The support bracket of claim 1 wherein the bracket comprises a channel shaped member having first and second leg portions joined by a central web portion therebetween, the first and second holes passing through the first leg portion and a third hole passing through the second leg portion in alignment with the second hole.

13. The support bracket of claim 12 wherein the second leg portion has a length shorter than the first leg portion in a direction in which the leg portions project from the central web portion.

14. The support bracket of claim 13 wherein the first hole is located at a position beyond the second leg portion in the direction in which the leg portions project from the central web portion.

15. The support bracket of claim 1 wherein the riser pipe is part of an oilfield pipeline.

* * * * *